United States Patent Office 3,006,973
Patented Oct. 31, 1961

3,006,973
HALOGENATED ORGANIC COMPOUNDS
Murray Hauptschein, Glenside, and Milton Braid, Philadelphia, Pa., assignors to Pennsalt Chemicals Corporation, Philadelphia, Pa., a corporation of Pennsylvania
No Drawing. Filed May 1, 1959, Ser. No. 810,211
20 Claims. (Cl. 260—653.8)

This invention relates to a method for adding iodine monofluoride across the double bond of a halogenated olefin, and is also concerned with certain new halogenated iodides prepared from this reaction.

Halogenated iodides, particularly those containing substantial amounts of fluorine, have many valuable uses. Such iodides are useful for example as telogens in so-called telomerization reactions for the production of low molecular weight open chain polymers, commonly referred to as telomers. Thus, halogenated iodides such as $CF_3I$ and $CF_2ClCFClI$ may be reacted with olefins such as perfluoropropene, chlorotrifluoroethylene, and vinylidene fluoride to produce valuable telomer iodides as disclosed in copending applications Ser. Nos. 701,995, filed December 11, 1957, 747,342, filed July 9, 1958, and 773,551, filed November 13, 1958, now U.S. Patent No. 2,975,220.

Due to the reactivity of the iodine atom, otherwise relatively inert halogenated compounds are able to undergo other useful and interesting reactions. It has been found, for example, that certain classes of halogenated iodides undergo reaction with chlorosulfonic or fluosulfonic acid to produce halogenated chlorosulfates and fluorosulfates which in turn undergo a large variety of interesting reactions as disclosed in copending application Serial No. 735,702, filed May 16, 1958. Through these and other techniques, halogenated iodides may be employed to prepare many compounds which have heretofore been impossible or difficult to prepare by other methods.

Many halogenated iodides, particularly those containing a high proportion of fluorine, are quite difficult to prepare, as evidenced by the fact that many of these iodides are now prepared by relatively tedious methods employing expensive reagents, such as by the reaction of anhydrous iodine with the silver salt of a fluorocarbon carboxylic acid.

In accordance with the present invention, a new, simple and convenient method has now been found through which certain classes of halogenated iodides, including many perfluoroiodides may be prepared in high yields. According to this new method, a mixture of elemental iodine and iodine pentafluoride is reacted under relatively mild conditions with an olefin having at least two fluorine atoms on the carbon atoms connected by the double bond. The mixture of iodine and iodine pentafluoride acts as a source of iodine monofluoride in this reaction, iodine and fluorine adding across the double bond. For example, the olefin $CF_2=CCl_2$ adds iodine monofluoride when reacted with this mixture to produce the iodide $CF_3CCl_2I$, while perfluoropropene adds iodine monofluoride to produce the secondary iodide $CF_3CFICF_3$.

In this reaction, the mixture of elemental iodine and iodine pentafluoride should be used in a molar ratio of $I_2:IF_5$ of at least 1:1. $IF_5$ by itself, or even in the presence of small amounts of elemental iodine, is essentially a fluorinating agent and gives very little or no conversion to the desired iodides. Best results are generally obtained when the $I_2:IF_5$ mole ratio is in the range of from 1.8:1 to 2.5:1, the optimum ratio being approximately 2:1. If desired, however, larger excesses of iodine for example mole ratios of $I_2:IF_5$ up to 5:1 may be used, although such excesses are generally wasteful.

Olefins which undergo reaction with such mixtures to add iodine monofluoride across the double bond are in general those having at least two fluorine atoms attached to the carbon atoms which are connected by a double bond. The fluorine atoms at the double bond may be arranged symmetrically with respect thereto as in the olefins $CFCl=CFCl$ or $CF_2=CF_2$, or asymmetrically as in the olefins $CF_2=CCl_2$ or $CF_2=CH_2$. Olefins in which the double bond is terminal rather than internal undergo the reaction more readily and are thus preferred. The olefin may be a mono, di or poly olefin. The reaction, however, will generally take place only at those double bonds having at least two fluorine atoms on the double bonded carbons. Particularly preferred are olefins containing at least 50 mole percent fluorine, particularly perfluoro, perfluorochloro, perfluorohydro and perfluorochlorohydro olefins. As used herein, perfluoro means containing only the elements carbon and fluorine. Perfluorochloro means containing only the elements carbon, fluorine and chlorine in which the molar ratio of fluorine:chlorine is at least 1:1. Perfluorohydro means containing only the elements carbon, fluorine and hydrogen in which the molar ratio of fluorine:hydrogen is at least 1:1. Perfluorochlorohydro means containing only the elements carbon, fluorine, chlorine and hydrogen in which the mole ratio of fluorine to chlorine plus hydrogen is at least 1:1.

The size of the olefin is not critical in the process of the invention. The invention will have its most usual application, however, with respect to olefins containing from 2 to 20 carbon atoms, and especially those containing from 2 to 5 carbon atoms.

Specific examples of olefins which may add iodine monofluoride in accordance with the invention are the perfluoro-olefins $CF_2=CF_2$, $CF_3CF=CF_2$, $CF_3CF_2CF=CF_2$, and in general, perfluoro olefins of the formula $C_nF_{2n}$. Other specific olefins which may be used in the process of the invention include $CF_2=CCl_2$; $CFCl=CFCl$;

$CF_2=CFCl$; $CF_2=CHCl$; $CF_2=CH_2$; $CF_2=CFH$;

$CF_2=CH-CF_3$; $CF_3CF=CFCl$; $CF_2ClCF=CFCl$ etc.

The high activity of the mixture of elemental iodine and iodine pentafluoride in adding iodine monofluoride to such olefins is apparent from the fact that the addition occurs in many cases at low temperatures down to as low as $-20°$ C. Depending upon the particular olefin it may in some cases be desirable to use temperatures as high as 225° C. although the preferred reaction temperatures in most cases will lie within the range of from $-5$ to $+150°$ C. Olefins which polymerize readily will add iodine monofluoride by the process of the invention at relatively low temperatures while those which are difficultly polymerizable such as perfluoropropene require somewhat higher temperatures for good conversions.

The reaction may be conducted at atmospheric pressure, although in many cases the reactants will be volatile at the reaction temperature employed, and it will be desirable in such cases to conduct the reaction under moderate superatmospheric pressures ranging e.g. from 50 lbs./in.$^2$ to 1000 lbs./in.$^2$ depending upon the pressure autogenously developed during the reaction. Higher pressure, however, up to any practical limit, e.g. 20,000 lbs./in.$^2$ may be used.

The molar ratio of olefin to the iodine-iodine pentafluoride mixture is not critical, although it is generally preferred to employ a stoichiometric excess of the olefin. Expressing the iodine-iodine pentafluoride mixture in terms of theoretical equivalents of iodine monofluoride in the mixture, the olefin:iodine monofluoride molar ratio should generally be in the range of from 0.5:1 to 10:1 and preferably in the range of from 1:1 to 3:1.

Reaction time is not critical. Reaction periods to obtain reasonable to good conversions will generally be from about one to thirty hours.

It is preferred to carry out the reaction in the presence of a catalyst. Certain catalysts have been found to considerably improve the reproducibility of results and to generally improve the yields and conversions obtained.

Effective catalyst include metallic aluminum, magnesium, thorium, beryllium, calcium and strontium. A preferred catalyst is metallic aluminum, particularly metallis aluminum essentially free from metals such as iron, copper, and zinc. Metallic aluminum, magnesium etc. may be employed alone as catalysts or as a mixture of the metal and the metal iodide, such as a mixture of aluminum metal and aluminum iodide. The latter combination, i.e. aluminum and aluminum iodide is a particularly preferred catalyst.

The concentration of the catalyst is not critcal. It is effective in very small amounts of e.g. 0.01% by weight of the theoretical iodine monofluoride in the iodine-pentafluoride mixture, or in larger amounts e.g. up to 10% by weight. Ordinarily, the catalyst will be employed in amounts ranging from 1 to 5% by weight of the theoretical iodine monofluoride in the iodine-iodine pentafluoride mixture.

Prior to reaction with the olefin, it is preferable to let the mixture of iodine-iodine pentafluoride stand in contact with one another for several hours, preferably while maintaining the mixture at an elevated temperature, ranging up to about 250° C. Usually, heating the mixture between temperatures of 75° C. and 200° C. for a period of 1 to 24 hours will give optimum results. Where a catalyst is employed, such as metallic aluminum, it is preferred to conduct the pre-heating of the iodine-iodine pentafluoride mixture in the presence of the catalyst. Apparently, by such pre-heating in the presence of the catalyst, the activity of the catalyst is improved since, by following this procedure, more reproducible results are obtainable, and generally higher yields and conversions result.

In some cases, such as in the addition of iodine monofluoride to tetrafluoroethylene in accordance with the invention to produce the iodide $CF_3CF_2I$, the reaction appears to proceed so vigorously that undesired side reactions are experienced, decreasing the conversions and yields to the desired iodide. For example, when tetrafluoroethylene is reacted with a mixture of iodine and iodine pentafluoride even at low temperatures, e.g. 0° C. in the absence of an inhibitor, the main product of the reaction is carbon tetrafluoride and free carbon apparently produced by disproportionation reactions with only small yields of the desired $CF_3CF_2I$. The vigor of the reaction can be mitigated, however, and such side products suppressed, by conducting the reaction in the presence of an inhibitor which may be of the type that acts to inhibit run-away polymerizations. One type of compound found particularly useful for this purpose are those containing the terminal group—$CCl_2I$, such as the compound $CF_2ClCCl_2I$ or $CF_3CCl_2I$, or in general compounds of the type $RCCl_2I$ where R is a halogenated organic radical, preferably having from 1 to 10 carbon atoms. Other inhibitors may be employed such as hydrocarbon thiols, e.g. octyl mercaptan, tertiary hydrocarbon amines such as tributyl amine or terpene hydrocarbons such as dipentene or terpinolene.

The following examples are intended to illustrate the invention.

*Example 1*

ADDITION OF IODINE MONOFLUORIDE TO $CF_2=CCl_2$

A 300 cubic centimeter Monel metal autoclave is charged with 56 grams (0.442 gram atom) of crystalline resublimed iodine and 24 grams (0.108 mole) of iodine pentafluoride (0.540 mole of theoretical iodine monofluoride) under a high purity dry nitrogen atmosphere. The autoclave is cooled in solid carbon dioxide and 100 grams (0.753 mole) of $CF_2=CCl_2$ is admitted by vacuum gaseous transfer. The autoclave is sealed and shaken for a period of 65 hours at a temperature of 20° to 25° C.

After reaction, the autoclave is opened and the reaction mixture is poured while stirring into an iced, saturated solution of sodium bisulfite made basic with sodium hydroxide. The resulting mixture is then neutralized with additional sodium hydroxide. The lower organic layer is separated, and dried with anhydrous calcium sulfate. There is obtained 72 grams (48% conversion based on theoretical monofluoride) of a mixture of iodides shown by vapor-liquid-partition chromatographic analysis to consist of a mixture of the isomers $CFCl_2CF_2I$ and $CF_3CCl_2I$, the mixture containing 88% of the latter isomer. Pure $CF_3CCl_2I$ is isolated by vapor-liquid-partition-chromatography. This new compound has a boiling point of 45° C. at 150 mm. Hg, a refractive index $n_D^{25}$ 1.4535, a melting point of 21° C. It has the following characteristic bands in the infrared spectrum (vapor): 7.81 (medium strong), 8.08 (very strong), 8.23 (very, very strong), 11.23 (strong), 11.96 (very strong), 12.8 (very strong) and 14.4 (very strong) microns. The absorption maximum in the ultraviolet spectrum taken in isooctane is at 296 m$\mu$. Analysis of $CF_3CCl_2I$: Calculated for $C_2Cl_2F_3I$: C, 8.61; Cl, 25.43; I, 45.51. Found: C, 8.68; Cl, 25.14; I, 45.88.

*Example 2*

ADDITION OF IODINE MONOFLUORIDE TO $CF_2=CCl_2$

A 300 cubic centimeter Monel metal autoclave is charged with 135 grams (1.065 gram atoms) of crystalline resublimed iodine and 48 grams (0.216 mole) of iodine pentafluoride (1.08 moles of theoretical iodine monofluoride) under a high purity dry nitrogen atmosphere. The autoclave is sealed and the mixture of iodine and iodine pentafluoride is heated at 100° C. for 2 hours. After cooling to room temperature, the autoclave is further cooled in solid carbon dioxide, evacuated and charged with 200 grams (1.51 moles) of $CF_2=CCl_2$ by vacuum gaseous transfer. The autoclave is sealed and shaken for 65 hours at a temperature of 20 to 25° C. After working up the reaction products as in Example 1, there is obtained 140.5 grams (47% conversion based on theoretical iodine monofluoride) of a mixture of the isomers $CFCl_2CF_2I$ and $CF_3CCl_2I$, the mixture containing 90% of the latter isomer.

*Example 3*

ADDITION OF IODINE MONOFLUORIDE TO $CF_2=CCl_2$

A 300 cc. Monel metal autoclave is charged with 56 grams (0.442 gram atom) of crystalline resublimed iodine, 24 grams (0.108 mole) of iodine pentafluoride and 2 grams of metallic aluminum under a high purity dry nitrogen atmosphere. The autoclave and contents is heated at 100° C. for 1 hour and is then cooled in solid carbon dioxide, evacuated, and 90 grams (0.676 mole) of $CF_2=CCl_2$ is charged to the autoclave by vacuum gaseous transfer. The autoclave and contents are then shaken at a temperature of 20 to 25° C. for 18 hours. The reaction products are worked up as in Example 1 to provide a yield of 122.5 grams (81% conversion based on theoretical iodine monofluoride) of a mixture of the isomers $CFCl_2CF_2I$ and $CF_3CCl_2I$, the latter isomer comprising 77% of the mixture.

*Example 4*

ADDITION OF IODINE MONOFLUORIDE TO $CF_2=CCl_2$

Example 3 is repeated except that the mixture of iodine, iodine pentafluoride and aluminum is pre-heated for 1½ hours at 130° C. after which the olefin is charged to the autoclave and the mixture is shaken for 17 hours at a temperature of 0° C. rather than 20° to 25° C. The products of this reaction consist of 96 grams of a mixture of the isomers $CFCl_2CF_2I$ and $CF_3Cl_2I$, the latter isomer comprising 95% of the mixture.

Example 5

ADDITION OF IODINE MONOFLUORIDE TO $CF_2=CCl_2$

A 300 cc. Monel metal autoclave is charged with 56 grams (0.442 gram atom) of crystalline resublimed iodine, 24 grams (0.108 mole) of iodine pentafluoride (0.540 mole of theoretical monofluoride), 2 grams of metallic aluminum of 99.99% purity and 2 grams of aluminum iodide under a high purity dry nitrogen atmosphere. In loading the autoclave, the aluminum metal is introduced first and then covered with the iodine-iodine pentafluoride mixture to avoid ignition of the aluminum by the flame reaction which occurs when aluminum iodide is contacted with iodine pentafluoride. The autoclave and contents is then heated at 130° C. for 2.5 hours, cooled to room temperature and then further cooled in solid carbon dioxide, evacuated and then charged by vacuum gaseous transfer with 110 grams (0.828 mole) of $CF_2=CCl_2$. The autoclave and contents is then shaken at 0° C. for 17 hours. The reaction products are worked up as in Example 1 to provide 125 grams (83% conversion based on theoretical iodine monofluoride) of a mixture of the isomers $CFCl_2CF_2I$ and $CF_3CCl_2I$, the latter isomer comprising 95% of the mixture.

Example 6

ADDITION OF IODINE MONOFLUORIDE TO $CF_3CF=CF_2$

A 300 cc. Monel metal autoclave is charged with a mixture of 56 grams (0.442 gram atom) of crystalline resublimed iodine, 24 grams (0.108 mole) of iodine pentafluoride, 2 grams of metallic aluminum of 99.99% purity and 2 grams of aluminum iodide under a high purity nitrogen atmosphere. The autoclave and contents is heated while shaking at 140 to 150° C. for 1¾ hours. The autoclave is cooled to room temperature, further cooled in solid carbon dioxide, evacuated, and charged by vacuum gaseous transfer with 114 grams (0.76 mole) of perfluoropropene. The reactor is sealed and heated at 125° C. for a total of 7 hours. On venting the autoclave 40 grams of unreacted perfluoropropene is recovered by condensation in a refrigerated receiver. The remaining reaction product is worked up by hydrolysis in iced, saturated sodium bisulfite solution made basic with sodium hydroxide followed by neutralization with additional sodium hydroxide. The lower organic layer is separated, dried with anhydrous calcium sulfate, and analyzed by vapor-liquid-partition-chromatography.

There is thus obtained 122 grams (77% conversion based on theoretical iodine monofluoride) of perfluoroisopropyl iodide $CF_3CFICF_3$ having a boiling point of 40° C. at 760 mm. Hg, a refractive index $n_D^{20}$ 1.327. This iodide is shown by vapor liquid partition chromatography to be the exclusive isomeric product. The elution times for air and $CF_3CFICF_3$ using a Perkin-Elmer two meter "B" column operating at 30° C. under a pressure of helium of 30 lbs./in.$^2$ gage are 0.6 minute and 8.7 minutes respectively. The infrared spectrum of the new compound $CF_3CFICF_3$ (vapor) has the following absorption bands: 7.31 (weak), 7.78 (very strong), 8.05 (very strong), 8.50 (strong), 8.92 (very strong), 10.45 (very strong), 11.08 (very strong), 13.34 (strong), and 14.07 (strong) microns. Only the 8.05 and 13.34μ bands are common to the vapor spectrum for n-perfluoropropyl iodide $CF_3CF_2CF_2I$. The absorption maximum of $CF_3CFICF_3$ in the ultraviolet spectrum taken in isooctane is at 276 mμ. This compound is analyzed as follows: Calculated for $C_3F_7I$: C, 12.17; I, 42.88. Found: C, 11.99; I, 42.44.

Example 7

ADDITION OF IODINE MONOFLUORIDE TO $CF_3CF=CF_2$

Example 6 was repeated except that, after charging the perfluoropropene to the autoclave, the autoclave was shaken at 25° C. for 17 hours. The conversion to $CF_3CFICF_3$ is 34% based on theoretical iodine monofluoride.

Example 8

ADDITION OF IODINE MONOFLUORIDE TO $CF_3CF=CF_2$

Example 6 was repeated except that, after charging the perfluoropropene to the autoclave, the autoclave was heated at a temperature of 62 to 75° C. for 20 hours to obtain a conversion to the iodide $CF_3CFICF_3$ of 52% based on theoretical iodine monofluoride.

Example 9

ADDITION OF IODINE MONOFLUORIDE TO $CF_2=CF_2$

A 300 cc. Monel autoclave is charged with a mixture of 48.5 grams (0.374 gram atom) of iodine, 18.4 grams (0.083 mole) of iodine pentafluoride, 1 gram of aluminum shavings of 99.99% purity and 1 gram of aluminum iodide under a high purity nitrogen atmosphere. The autoclave is sealed and after which it is heated for 2 hours at 130 to 140° C. The autoclave is cooled, opened, and charged with 3 grams (0.0102 mole) of 1,1,2-trichloro-2,2-difluoro-1-iodoethane, $CF_2ClCCl_2I$, as an inhibitor. The reactor is sealed, cooled in liquid nitrogen, evacuated and charged by vacuum gaseous transfer with 55 grams (0.55 mole) of tetrafluoroethylene. The reaction mixture is shaken at room temperature over night and then heated while shaking at 50° C. for 7 hours. On venting the autoclave there is recovered by condensation in refrigerated receivers 11 grams of unreacted olefin. By distillation of the remaining product there is collected a total of 80 grams (78% conversion based on maximum theoretical iodine monofluoride) of $C_2F_5I$ shown by vapor liquid partition chromatographic analysis and by its infrared spectrum to be more than 99% pure.

In a similar run in the absence of $CF_2ClCCl_2I$ at 20 to 25° C. there is obtained only a small yield of $CF_3CF_2I$, the principal products being $CF_4$ and carbon.

Example 10

ADDITION OF IODINE MONOFLUORIDE TO $CF_2=CFCl$

A 300 cc. Monel metal autoclave is charged with a mixture of 126.9 grams (0.999 gram atom) of iodine and 45 grams (0.203 mole) of iodine pentafluoride under a high purity dry nitrogen atmosphere. The autoclave is sealed and heated with shaking at 100° C. for 2 hours. After cooling to room temperature, the reactor is further cooled in liquid nitrogen and evacuated, after which 200 grams (1.72 moles) of chlorotrifluoroethylene is admitted to the autoclave by gaseous vacuum transfer. The reactor is sealed and the reaction mixture shaken for 2 hours at 0° to 10° C. The temperature is then allowed to rise and shaking is continued at 20° to 25° C. for 2 additional days. Upon venting the autoclave there is recovered 61 grams of unreacted olefin. The remaining liquid products in the reactor are washed with cold saturated aqueous sodium bisulfite solution made basic with sodium hydroxide and then washed with water. The organic layer is separated and dried. There is obtained 253 grams (95% conversion based on maximum theoretical iodine monofluoride) of a liquid product boiling mainly at 54° to 56° C., having a refractive index $n_D^{24}$ 1.394 and shown by vapor liquid partition chromatographic analysis to consist almost entirely of a mixture of the isomers $CF_2ClCF_2I$ and $CF_3CFClI$, the latter new isomer comprising 45% of the mixture. Using a Perkin-Elmer two meter "B" column operating at 50° C. under a pressure of helium of 30 lbs./in.$^2$ gage, pure samples of each iodide were obtained, the respective elution times for air, $CF_2ClCF_2I$ and $CF_3CFClI$ being 0.55, 10.6 and 12.2 minutes respectively.

The infrared vapor spectrum of $CF_2ClCF_2I$ matches that of a sample prepared by the addition of iodine monochloride to tetrafluoroethylene, having characteristic bands at 8.03 (strong), 8.47 (very strong), 8.86 (very strong), 9.76 (strong), 11.46 (strong) and 12.82 (very strong) microns. Characteristic absorption bands in the infrared spectrum of $CF_3CFClI$ are at 7.85 (very strong), 8.12 (very, very strong), 8.22 (very strong), 9.16 (strong), 10.89 (strong), 11.88 (very strong), and 13.90 (strong) microns.

Absorption maxima in the ultraviolet spectrum taken in isooctane are at 271 m$\mu$ for $CF_2ClCF_2I$ and at 282 m$\mu$ for $CF_3CFClI$. Analysis of $CF_3CFClI$: Calculated for $C_2Cl_4I$: C, 9.15; Cl, 13.51. Found: C, 9.44; Cl, 13.53.

*Example 11*

ADDITION OF IODINE MONOFLUORIDE TO $CF_2$=CFCl

Example 10 was repeated except that, after the addition of the olefin, the mixture was reacted with shaking for 17 hours at 0° C. to give a 52% conversion (based on maximum theoretical iodine monofluoride) to the same mixture of iodide isomers shown by vapor liquid partition chromatographic analysis to contain 51.3% of the isomer $CF_3CFClI$.

*Example 12*

ADDITION OF IODINE MONOFLUORIDE TO CFCl=CFCl

A 300 cc. Monel metal autoclave is charged with a mixture of 56 grams (0.442 gram atom) of crystalline resublimed iodine, 24 grams (0.108 mole) of iodine pentafluoride, and 2 grams of aluminum shavings of 99.99% purity. The autoclave and contents is sealed and heated while shaking in nitrogen atmosphere at 130° C. for 1½ hours. The reactor is cooled to room temperature and then further cooled in solid carbon dioxide, evacuated and then charged by vacuum gaseous transfer with 95 grams (0.714 mole) of 1,2-dichloro-1,2-difluoroethylene CFCl=CFCl after which the vessel is sealed and shaken at 25° C. for about 17 hours. After cooling in ice, the autoclave is opened and the contents poured into iced, saturated sodium bisulfite solution. The resulting mixture is neutralized with sodium hydroxide solution and the lower organic layer is separated and dried with anhydrous calcium sulfate. Analysis by vapor-liquid-partition chromatography of the product (79 grams) thus obtained shows it to consist of 72.5 mole percent of CFCl=CFCl and 26.2 mole percent of $CF_2ClCFClI$ (23 percent conversion based on maximum theoretical iodine monofluoride). The infrared spectrum of this iodide matches that of a simple prepared by the addition of iodine monochloride to chlorotrifluoroethylene.

*Example 13*

ADDITION OF IODINE MONOFLUORIDE TO $CF_2$=CHCl

A 300 cc. Monel metal autoclave is charged with a mixture of 56 grams (0.442 gram atom) of crystalline resublimed iodine, 24 grams (0.108 mole) of iodine pentafluoride, 2 grams of aluminum shavings of 99.99% purity, and 7 grams of aluminum iodide under a high purity dry nitrogen atmosphere. The autoclave is sealed and heated while shaking for 2 hours at 135° to 140° C. After cooling to room temperature, the reactor is further cooled in solid carbon dioxide and evacuated, and 64 grams (0.649 mole) of 1-chloro-2,2-difluoroethylene is admitted to the autoclave by vacuum gaseous transfer. The autoclave is sealed and shaken over night at room temperature. On venting the autoclave there is recovered by condensation in refrigerated receivers a total of 31 grams of unreacted olefin. The remaining liquid products from the autoclave are hydrolyzed in cold, aqueous, saturated sodium bisulfite solution made basic with potassium hydroxide. The resulting mixture is neutralized with additional potassium hydroxide solution. The lower organic layer is separated and dried with anhydrous calcium sulfate. There is thus obtained 65 grams of a liquid product which is distilled to provide a middle cut having a boiling point of 80° C. a refractive index of $n_D^{26}$ 1.4304 and shown by vapor-liquid-partition chromatographic analysis to contain 90 mole percent of the iodide $CF_3CHClI$ (48% conversion based on maximum theoretical iodine monofluoride). The absorption maximum in isooctane of this iodide is at 275 m$\mu$. Characteristic absorption bands in the infrared spectrum of $CF_3CHClI$ are at 7.66 (very strong), 7.89 (very strong), 8.39 (very strong), 8.61 (very strong), 9.03 (very strong), 11.0 (medium strong), 11.6 (strong), 12.5 (very strong), 13.8 (medium strong), and about 15 (strong) microns. The iodide $CF_3CHClI$ is analyzed with the following results. Calculated for $C_2HClF_3I$: C, 9.84; H, 0.44; F, 23.39; I, 52.01. Found: C, 10.04; H, 0.31; F, 23.12; I, 52.17.

*Example 14*

ADDITION OF IODINE MONOFLUORIDE TO $CF_2$=$CH_2$

A 300 cc. Monel autoclave is charged with a mixture of 56 grams (0.442 gram atom) of crystalline iodine, 24 grams, 0.108 mole) of iodine pentafluoride, 2 grams of aluminum shavings of 99.99% purity and 2 grams of aluminum iodide. The autoclave is sealed and heated while shaking at 130 to 140° C. for 2 hours. After cooling to room temperature, the autoclave is further cooled in liquid nitrogen, evacuated whereupon 50.5 grams (0.790 mole) of $CF_2$=$CH_2$ is admitted by vacuum gaseous transfer. The autoclave is sealed and shaken at 0° to 12° C. for 18.5 hours and then at 50° C. for 3 hours. The products of this reaction are separated chromatographically using a 2 meter Perkin-Elmer "B" column operating at 30° C. and under a pressure of helium of 30 lbs./in.$^2$ gage, and a small yield of $CF_3CH_2I$ is obtained. The respective elution times for air and for $CF_3CH_2I$ are 0.65 and 26.8.

*Example 15*

ADDITION OF IODINE MONOFLUORIDE TO $CF_2$=CHF

A 300 cc. Monel metal autoclave is charged with a mixture of 56 grams (0.442 gram atom) of crystalline iodine, 24 grams (0.108 mole) of iodine pentafluoride, 2 grams of aluminum shavings of 99.99% purity and 2 grams of aluminum iodide under a high purity, dry nitrogen atmosphere. The reactor is sealed and heated for 2 hours at 130° C. while shaking. The reactor is cooled to room temperature and then further cooled in liquid nitrogen and evacuated whereupon 62 grams (0.757 mole) of trifluoroethylene is admitted to the autoclave by vacuum gaseous transfer. After sealing, the autoclave is shaken at room temperature for 16 hours and at 70° to 83° C. for 15 hours.

There is obtained from this reaction 15 grams of $CF_3CHFI$ as the exclusive isomeric iodide. A pure sample of this iodide is isolated by vapor-liquid-partition chromatography using a 2 meter Perkin-Elmer "B" column operating at 30° C. under a pressure of helium of 30 lbs./in.$^2$ gage. The respective elution times for air and $CF_3CHFI$ are 0.55 and 19.1 minutes. The iodide $CF_3CHFI$ is a colorless liquid having a refractive index $n_D^{25}$ 1.3665. The maximum in the ultraviolet spectrum of this iodide taken in isooctane is at 262 m$\mu$. The analysis of the iodide $CF_3CHFI$ is as follows. Calculated for $C_2HF_4I$: C, 10.54, H, 0.44; F, 33.34; I, 55.68. Found: C, 10.20; H, 0.68; F, 33.19; I, 55.65.

Many of the compounds that may be prepared by the method of the invention are new compounds which are difficult or impossible to prepare by other methods and which have valuable uses. Thus, by means of the invention, the compound $CF_3CCl_2I$ may be readily prepared in good yields from the corresponding olefin $CF_2$=$CCl_2$ as described above. Similarly, by adding iodine monofluoride to the corresponding olefins, homologous compounds of the series $C_nF_{2n+1}CCl_2I$ may be prepared in a similar manner. The compound $CF_3CCl_2I$ and its homologs are telogens of unusually valuable properties from which telomers of halogenated olefins, particularly $CF_2$=CFCl and $CF_2$=$CF_2$ may be prepared. For example, by the thermal reaction of the iodide $CF_3CCl_2I$ with the olefin $CF_2$=CFCl at temperatures of about 140° C. and pressures of the order of 500 lbs./in.$^2$ gage, valuable telomers of the formula $$CF_3CCl_2(CF_2CFCl)_nI$$

may be obtained. Similarly, telomers of the formula $CF_3CCl_2(CF_2CF_2)_nI$ may be prepared from the iodide $CF_3CCl_2I$ and tetrafluoroethylene. Such telomerization reactions and the telomers produced are described and claimed in our copending application Serial No. 756,491, filed August 21, 1958. As explained in that application, telogens of the type $CF_3CCl_2I$ provide excellent results due apparently to the —$CCl_2I$ group adjacent to perfluoroalkyl or perfluorochloroalkyl groups. Telomer products of narrows ranges of molecular weights can be produced in high yields in contrast to the usual behavior of telomerization reactions wherein a large spread of molecular weight products is obtained. Furthermore, because the other end of the telogen molecule is perfluorinated, at least one end of the telomer terminates in a perfluoro group which greatly contributes to chemical and thermal stability and to superior surface properties. Where tetrafluoroethylene is the olefin participating in the telomerization, both ends of the telomer are perfluorinated and the —$CCl_2$— group is flanked on both sides with perfluorinated carbons which apparently has a strong influence in stabilizing the —$CCl_2$— group. Thus, the new compounds $C_nF_{2n+1}CCl_2I$ which may be prepared in accordance with the invention represent a valuable class of new iodides.

In accordance with the invention, it is also possible to prepare the new secondary iodide $CF_3CFICF_3$ which has a number of valuable uses not possessed by the known n-perfluoro iodide $CF_3CF_2CF_2I$. Thus, perfluoroisopropyl iodide may react with chlorosulfonic acid at a temperature of approximately 100° C. to form the secondary chlorosulfate

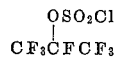

This secondary chlorosulfate may be then hydrolyzed to the perfluoro ketone

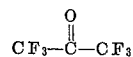

This represents a facile method for the preparation of this perfluoro ketone which is difficult to prepare by other methods.

The new iodides $CF_3CFClI$, $CF_3CHClI$, and $CF_3CHFI$ which are prepared as described above are also valuable new compounds. Due to the reactivity of the iodine, these compounds may undergo coupling reactions in the presence of metallic mercury and ultraviolet irradiation to produce butanes which are valuable as heat transfer liquids and/or dielectric liquids. Thus, the compound $CF_3CFClI$ may be coupled in the presence of mercury by splitting out iodine intermolecularly to provide the compound $CF_3CFClCFClCF_3$. The iodide $CF_3CFClI$ is also a useful telogen particularly for the telomerization of vinylidene fluoride to produce telomers of the formula $CF_3CFCl(CH_2CF_2)_nI$.

In general, the iodide products produced by the process of the invention are useful telogens in telomerization reactions and furthermore because of the reactivity of the iodide, they undergo many unique reactions such as reaction with chlorosulfonic or fluosulfonic acid to form chlorosulfates and fluosulfates respectively as described in copending application Serial No. 735,702, filed May 16, 1958. The resulting chlorosulfates and fluosulfates undergo a number of new unique reactions as described in that application.

This application is a continuation-in-part of our copending application Serial No. 735,702, filed May 16, 1958, for "Halogenated Organic Compounds," by Murray Hauptschein and Milton Braid, and of our copending application Serial No. 756,491, filed August 21, 1958.

We claim:

1. A method for preparing halogenated iodides which comprises the step of reacting an olefin having a double bond with at least two fluorine atoms on the carbon atoms connected by said double bond with a mixture of iodine and iodine pentafluoride in which the molar ratio of iodine:iodine pentafluoride is at least 1:1.

2. A method in accordance with claim 1 in which the molar ratio of iodine to iodine pentafluoride ranges from 1:1 to 5:1.

3. A method in accordance with claim 1 in which the molar ratio of iodine to iodine pentafluoride ranges from 1.8:1 to 2.5:1.

4. A method for preparing halogenated iodides which comprises the step of reacting an olefin having a terminal double bond with at least two fluorine atoms on the carbon atoms connected by said double bond with a mixture of iodine and iodine pentafluoride in which the molar ratio of iodine to iodine pentafluoride is at least 1:1.

5. A method for preparing halogenated iodides which comprises the step of reacting an olefin selected from the group consisting of perfluoro, perfluorochloro, perfluorohydro and perfluorochlorohydro olefins having a double bond with at least two fluorine atoms on the carbon atoms connected by said double bond with a mixture of iodine and iodine pentafluoride in which the molar ratio of iodine to iodine pentafluoride is at least 1:1.

6. A method for preparing halogenated iodides which comprises the step of reacting an olefin having from 2 to 20 carbon atoms and selected from the class consisting of perfluoro, perfluorochloro, perfluorohydro and perfluorochlorohydro olefins having a terminal double bond with at least two fluorine atoms on the carbon atoms connected by said double bond with a mixture of iodine and iodine pentafluoride in which the molar ratio of iodine to iodine pentafluoride is at least 1:1.

7. A method for preparing halogenated iodides which comprises the step of reacting an olefin having from 2 to 5 carbon atoms and selected from the class consisting of perfluoro, perfluorochloro, perfluorohydro and perfluorochlorohydro monoolefins having a terminal double bond with at least two fluorine atoms on the carbon atoms connected by said double bond with a mixture of iodine and iodine pentafluoride in which the molar ratio of iodine to iodine pentafluoride is at least 1:1.

8. A method for preparing halogenated iodides which comprises the step of reacting a haloethylene having at least 2 fluorine atoms with a mixture of iodine and iodine pentafluoride in which the molar ratio of iodine to iodine pentafluoride is at least 1:1.

9. A method for preparing halogenated iodides which comprises the step of reacting an olefin having a double bond with at least two fluorine atoms on the carbon atoms connected by said double bond with a mixture of iodine and iodine pentafluoride in which the molar ratio of iodine to iodine pentafluoride is at least 1:1 in the presence of a catalyst selected from the class consisting of metallic aluminum, magnesium, thorium, beryllium, calcium and strontium.

10. A method in accordance with claim 9 in which the mixture of catalyst and iodine and iodine pentafluoride is preheated prior to reaction with said olefin.

11. A method for preparing halogenated iodides which comprises the step of reacting an olefin having a double bond with at least two fluorine atoms on the carbon atoms connected by said double bond with a mixture of iodine and iodine pentafluoride in which the molar ratio of iodine to iodine pentafluoride is at least 1:1 in the presence of metallic aluminum as a catalyst.

12. A method in accordance with claim 11 in which the mixture of aluminum, iodine and iodine pentafluoride is preheated prior to reaction with said olefin.

13. A method for preparing halogenated iodides which comprises the step of reacting an olefin having a double bond with at least two fluorine atoms on the carbon atoms connected by said double bond with a mixture of iodine and iodine pentafluoride in which the molar ratio of iodine to iodine pentafluoride is at least 1:1 in the presence of a catalyst comprising metallic aluminum and aluminum iodide.

14. A method in accordance with claim 13 in which the mixture of aluminum, aluminum iodide, iodine and iodine pentafluoride is preheated prior to reaction with said olefin.

15. A method for preparing halogenated iodides which comprises the step of reacting an olefin having a double bond with at least two fluorine atoms on the carbon atoms connected by said double bond with a mixture of iodine and iodine pentafluoride in which the molar ratio of iodine to iodine pentafluoride is at least 1:1 at a temperature of from −20° C. to +225° C.

16. A method in accordance with claim 15 in which said temperature ranges from −5° C. to +150° C.

17. A method for preparing the iodide $CF_3CCl_2I$ which comprises the step of reacting $CF_2=CCl_2$ with a mixture of iodine and iodine pentafluoride in which the molar ratio of iodine to iodine pentafluoride is at least 1:1.

18. A method for preparing the iodide $CF_3CCl_2I$ which comprises the step of reacting $CF_2=CCl_2$ with a mixture of iodine and iodine pentafluoride in which the molar ratio of iodine to iodine pentafluoride is in the range of from 1.8:1 to 2.5:1 in the presence of metallic aluminum as a catalyst.

19. A method for the preparation of perfluoroisopropyl iodide $CF_3CFICF_3$ which comprises the step of reacting perfluoropropene with a mixture of iodine and iodine pentafluoride in which the molar ratio of iodine to iodine pentafluoride is in the range of from 1.8:1 to 2.5:1 in the presence of metallic aluminum as a catalyst.

20. A method for the preparation of the iodide $CF_3CF_2I$ which comprises the step of reacting $CF_2=CF_2$ with a mixture of iodine and iodine pentafluoride in which the molar ratio of iodine to iodine plentafluoride is in the range of from 1.8:1 to 2.5:1 in the presence of metallic aluminum as a catalyst and in the presence of a polymerization inhibitor.

References Cited in the file of this patent

UNITED STATES PATENTS

| | | |
|---|---|---|
| 2,424,667 | Raasch | July 29, 1947 |
| 2,598,411 | Miller et al. | May 27, 1952 |
| 2,614,131 | Simons et al. | Oct. 14, 1952 |
| 2,880,247 | Miller | Mar. 31, 1959 |

OTHER REFERENCES

Locket et al.: Jour. Am. Chem. Soc., volume 56, pages 1726–1728, August 1934.

Gilman et al.: Jour. Am. Chem. Soc., volume 65, pages 1458–1460, August 1943.

McBee et al.: Ind. & Eng. Chem., volume 39, No. 3, pages 409–412, March 1947.

Haszeldine, Jour. Chem. Soc. (London), 1952, pages 4423–4431, only page 4423 necessary.

Park et al.: Jour. Am. Chem. Soc., volume 78, page 59–62, January 1956.

Simons et al.: Jour. Am. Chem. Soc., vol. 62, pages 3477–3480, December 1940.